(12) United States Patent
Schmidt et al.

(10) Patent No.: US 9,414,224 B1
(45) Date of Patent: Aug. 9, 2016

(54) ANTENNA PORT IDENTIFICATION

(71) Applicant: SPRINT COMMUNICATIONS COMPANY L.P., Overland Park, KS (US)

(72) Inventors: Patrick Jacob Schmidt, Bonner Springs, KS (US); Joshua Torey Koenig, Lawrence, KS (US)

(73) Assignee: Sprint Communications Company L.P., Overland Park, KS (US)

(*) Notice: Subject to any disclaimer, the term of this patent is extended or adjusted under 35 U.S.C. 154(b) by 211 days.

(21) Appl. No.: 13/674,598

(22) Filed: Nov. 12, 2012

(51) Int. Cl.
*H04W 12/02* (2009.01)
*H04W 12/06* (2009.01)
*H04W 4/00* (2009.01)
*H04M 1/725* (2006.01)
*G06F 3/048* (2013.01)
*H04L 29/06* (2006.01)
*H04B 5/00* (2006.01)

(52) U.S. Cl.
CPC .............. *H04W 12/02* (2013.01); *G06F 3/048* (2013.01); *H04B 5/0031* (2013.01); *H04M 1/7253* (2013.01); *H04W 4/008* (2013.01); *H04W 12/06* (2013.01); *G06F 2221/2129* (2013.01); *H04L 63/0861* (2013.01); *H04L 63/108* (2013.01); *H04M 2250/04* (2013.01); *H04M 2250/12* (2013.01)

(58) Field of Classification Search
None
See application file for complete search history.

(56) References Cited

U.S. PATENT DOCUMENTS

| | | | | |
|---|---|---|---|---|
| 5,949,302 A | * | 9/1999 | Sarkka | H01P 1/2084 333/126 |
| 6,308,064 B1 | * | 10/2001 | Green | 455/423 |
| 2004/0127247 A1 | * | 7/2004 | Reece et al. | 455/550.1 |
| 2008/0095223 A1 | * | 4/2008 | Tong et al. | 375/228 |
| 2010/0222106 A1 | * | 9/2010 | Wang | H04B 7/0686 455/562.1 |
| 2011/0051787 A1 | * | 3/2011 | Warren et al. | 375/224 |
| 2012/0021790 A1 | * | 1/2012 | Kister et al. | 455/507 |
| 2012/0050105 A1 | * | 3/2012 | Wu | 342/367 |
| 2012/0208581 A1 | * | 8/2012 | Ishida et al. | 455/509 |
| 2013/0072125 A1 | * | 3/2013 | Yoon et al. | 455/67.11 |

FOREIGN PATENT DOCUMENTS

WO WO0021226 * 4/2000

* cited by examiner

*Primary Examiner* — Ping Hsieh
*Assistant Examiner* — James Yang

(57) ABSTRACT

Systems, methods, and computer-readable media, for facilitating identification of antenna ports. In some embodiments, the method includes receiving a test signal transmitted through a physical path to an antenna port. Upon receiving a test signal, a response can be provided that includes an indication of the antenna port that received the test signal. Such a response signal can be provided in any number of manners.

19 Claims, 4 Drawing Sheets

ANTENNA PORT IDENTIFICATION

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, facilitating identification of antenna ports. In this regard, physical antenna ports can be remotely identified, for example, to properly implement and/or verify configuration of connectivity between radio and antenna ports. Utilizing embodiments hereof, identification devices associated with one or more ports of an antenna can be used to facilitate identification of a particular antenna. In this way, upon an identification device receiving a test signal, an antenna port indicator can be provided to identify the antenna port that received the test signal.

BRIEF DESCRIPTION OF THE DRAWINGS

Illustrative embodiments of the present invention are described in detail below with reference to the attached drawing figures, and wherein.

DETAILED DESCRIPTION

Figure 1:
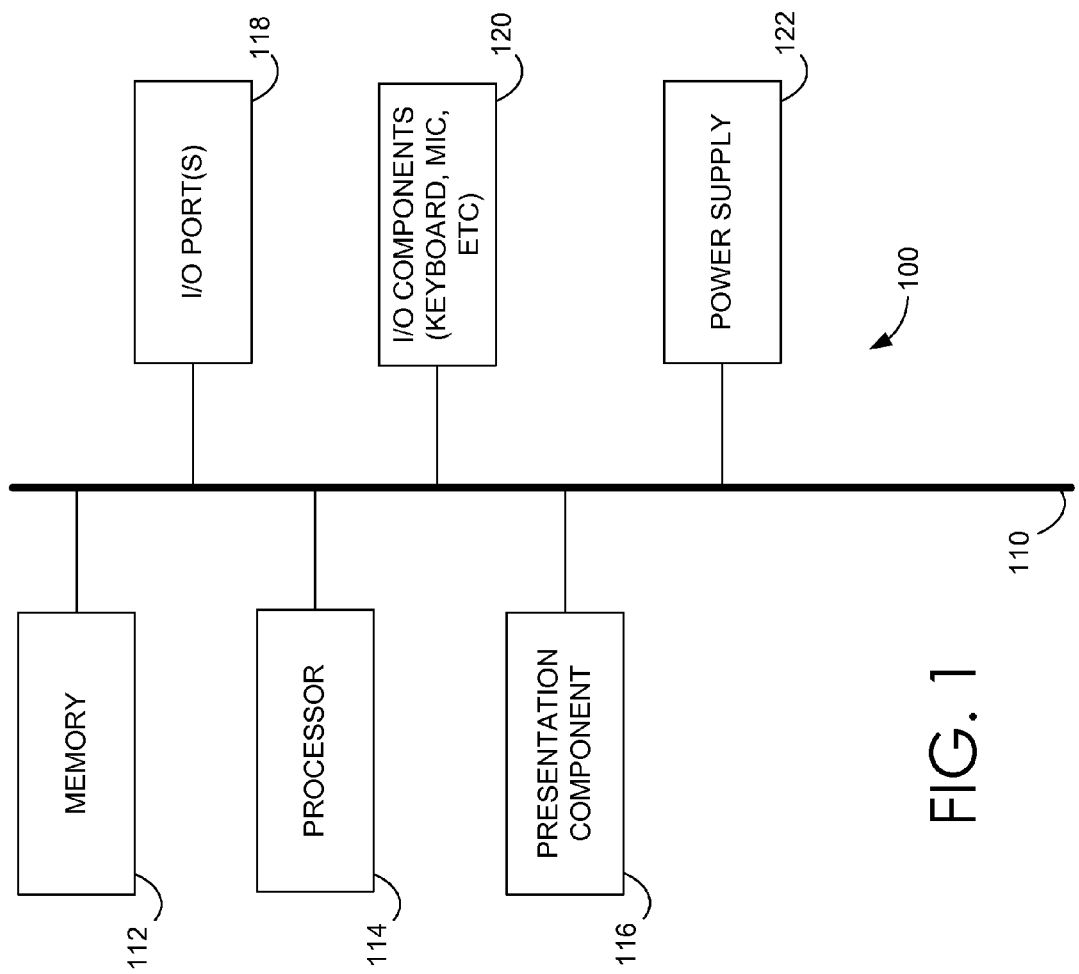
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for facilitating identification of antenna ports. In this regard, physical antenna ports can be remotely identified, for example, to properly implement and/or verify configuration of connectivity between radio and antenna ports. Utilizing embodiments hereof, identification devices associated with one or more ports of an antenna can be used to facilitate identification of a particular antenna port. In this way, upon an identification device connected to an antenna port receiving a test signal, an antenna port indicator can be provided to identify the port that received the test signal.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3 G Third-Generation Wireless Technology
4 G Fourth-Generation Cellular Communication System
CD-ROM Compact Disk Read Only Memory
CDMA Code Division Multiple Access
GPRS General Packet Radio Service
GSM Global System for Mobile communications: originally from Groupe Spécial Mobile
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple In Multiple Out
PC Personal Computer
PCS Personal Communications Service
PDA Personal Digital Assistant
RAM Random Access Memory
ROM Read Only Memory
TDMA Time Division Multiple Access
UMTS Universal Mobile Telecommunications Systems
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative computing device according to one embodiment is provided and referenced generally by the numeral 100. Although some components are shown in the singular, they may be plural. For example, computing device 100 might include multiple processors or multiple radios, etc. As illustratively shown, computing device 100 includes a bus 110 that directly or indirectly couples various components together including memory 112, a processor 114, a presentation component 116, input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention facilitate identification of antenna ports. In this regard, physical antenna ports can be identified. Identifying antenna ports can be beneficial for a number of reasons. Initially, antenna port identification facilitates proper implementation and/or verification of configuration and connectivity between radio and antenna ports. Various network technologies, such as LTE and other 4 G technologies, use multiple antenna paths between a radio and an antenna for transmitting signals. For instance, multiple physical paths may be used to communicate, for example, to increase bandwidth or speed (e.g., to optimize downloading/uploading, etc.).

As radio technology incorporates increasing numbers of physical paths to transmit and receive signals, the need for antenna port identification also increases. Such proper implementation and/or configuration verification becomes increasingly important as the functionality of base station and radio frequency techniques advance. For example, beam forming and MIMO are exemplary implementations of advanced base station and radio frequency techniques. In this regard, recognizing which physical paths are connected to which antenna ports is beneficial so that signals can be transmitted on an appropriate physical path and/or antenna port to obtain a desired performance. That is, it is beneficial to understand which physical paths and/or antenna ports signals or data are being transmitted so that optimal technology can be used in that instance. For example, with MIMO, better performance may occur with antenna elements that are spaced closely or spaced further apart or that have different angles or orientation.

While antenna port identification is becoming increasingly important, manual identification of antenna ports can be difficult as antennas are generally positioned in an elevated location near the top of a radio tower. In this regard, antenna ports that are used to connect physical paths being used for signal transmission are not easily accessible for a user or technician. For instance, to access the antenna ports within an antenna, a technician would need to elevate himself/herself to the top of the radio tower to be able to access the antenna ports. Further, in some cases, radios are also installed at or near the top of the radio tower thereby preventing easy physical access to any physical paths from the ground.

Utilizing embodiments hereof, physical antenna ports can be remotely identified such that a technician is not required to physically maneuver to an antenna to identify antenna ports. In implementations, identification devices associated with one or more ports of an antenna can be used to facilitate identification of a particular antenna port. In this way, upon an identification device connected to an antenna port receiving a test signal, an antenna port indicator can be provided to identify the port that received the test signal.

According, in one aspect, the present invention is directed to one or more computer-readable media having computer-executable instructions embodied thereon that, when executed, perform a method for facilitating identification of antenna ports. The method includes receiving a test signal transmitted through a physical path to an antenna port. A response signal is provided that includes an indication of the antenna port that received the test signal.

In another aspect, embodiments of the present invention are directed to a system for facilitating identification of antenna ports. The system includes a radio including a transceiver that transmits and receives signals, wherein the radio transmits test signals via physical paths. The system also includes an antenna having antenna ports. Each antenna port has an identification device that identifies a test signal received at the corresponding antenna port and provides an indication of the antenna port that received the test signal.

In yet another aspect, a method for facilitating identification of antenna ports. The method includes transmitting a test signal that indicates an intent to identify an antenna port within an antenna that receives the test signal. The test signal is transmitted at least from a radio to the antenna via a physical path that connects the radio and the antenna port. The method also includes receiving an indication of the antenna port that received the test signal.

Figure 2:
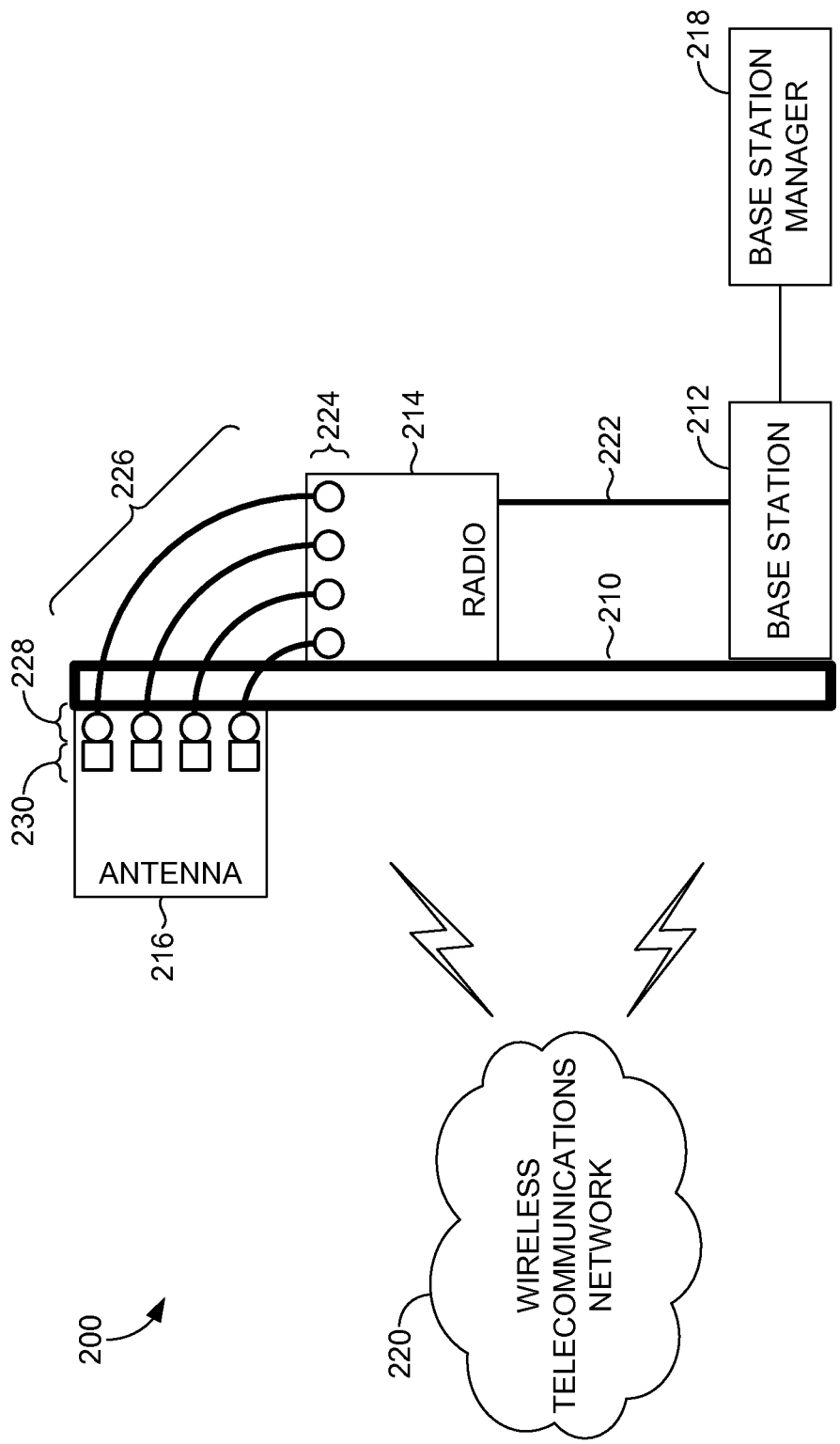
FIG. 2 is a schematic view of an exemplary environment suitable for use in implementing embodiments of the present invention.

Turning now to FIG. 2, an exemplary environment suitable for use in implementing embodiments of the present invention is illustrated and designated generally as environment 200. Environment 200 is but one example of a suitable environment and is not intended to suggest any limitation as to the scope of use or functionality of the invention. Neither should the environment be interpreted as having any dependency or requirement relating to any one or combination of components illustrated.

In the environment 200, a radio tower 210 is installed in environment 200. A radio tower is typically a tall structure designed to support an antenna(s) for telecommunications and/or broadcasting. A radio tower is not intended herein to be limited to any shape and/or structure. For example, a radio tower 210 may be a building or pole on which a transmitting antenna is installed. In other embodiments, a mobile radio tower may be employed.

As illustrated in FIG. 2, the radio tower 210 includes or is associated with a base station 212, a radio 214, and an antenna 216. In embodiments, base station 212 is a wireless communications station that is installed at a fixed location, such as near the base of the radio tower 210. In other embodiments, base station 212 is a mobile base station. The base station 212 is used to communicate as part of a wireless telecommunications network 220. For example, base station 212 facilitates wireless communication between user devices and a network (s). A user device include a device that uses a wireless communications network. A user device may take on a variety of forms, such as a personal computer (PC), a laptop computer, a tablet, a mobile phone, a personal digital assistant (PDA), a server, or any other device that is cable of communicating with other devices using a wireless telecommunications network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like.

A wireless telecommunications network, such as wireless telecommunications network 220, refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), LTE, Universal Mobile Telecommunications Systems (UMTS), Integrated Digital Enhanced Network (iDEN), WiMAX, 3 G, 4 G, and Personal Communications Service (PCS). A wireless telecommunications network might include an array of devices. Components such as a base station, a communications tower, or even access points (as well as other components) can provide wireless connectivity in some embodiments.

In some cases, the base station 212 communicates with a base station manager 218. Base station manager 218 can control the base station 212 as well as one or more additional base stations. The base station manager 218 includes an interface for interacting with the base station 212. In embodiments, the base station manager 218 remotely controls or manages a group of base stations, including base station 212. As such, base station manager 218 can communicate with the base station 212 using a network. Such a network might be a single network or multiple networks, as well as being a network of networks. A network(s) might comprise, for example, a cable network, an Intranet, the Internet, a wireless network (e.g., a wireless telecommunications network), or a combination thereof or portions thereof.

The base station 212 can communicate with the radio 214. In embodiments, radio 214 is a transceiver or includes a transceiver configured to receive and transmit signals or data. In some embodiments, the radio 214 is integrated with the base station 212. In other embodiments, as illustrated in FIG. 2, the radio 214 is remote from the base station 212. In such an embodiment, the base station 212 can communicate with the radio 214, for example, using a data transmission path 222, such as a fiber optic cable.

Although the radio 214 is illustrated at or near the top of the radio tower 210, as can be appreciated, the radio 214 can be installed in any number of locations and such an installation location is not intended to limit the scope of embodiments of the present invention. For example, the radio 214 can be installed at or near the bottom of the radio tower 210, in the center of the radio tower 210, integrated with the base station 212, or the like.

The radio 214 generally communicates with the antenna 216. In this regard, the radio 214 is used to transmit signals or data to the antenna 216 and receive signals or data from the antenna 216. Communications between the radio 214 and the antenna 216 can occur using any number of physical paths. A physical path, as used herein, refers to a path used for transmitting signals or data. As such, a physical path may be referred to as a radio frequency (RF) path, a coaxial cable path, cable path, or the like.

As such, radio 214 includes one or more ports 224 used to connect one or more physical paths 226 to the radio 214. For instance, a first port can connect a first physical path to a radio, a second port can connect a second physical path to the radio, a third port can connect a third physical path to the radio, and a fourth port can connect a fourth physical path to the radio.

The antenna 216 is used for telecommunications. Generally, an antenna is an electrical device that converts electric power into radio waves and converts radio waves into electric power. The antenna 216 is typically positioned at or near the top of the radio tower 210. Such an installation location, however, is not intended to limit the scope of embodiments of the present invention.

The antenna 216 generally communicates with the radio 214. In this regard, the antenna 216 is used to transmit signals or data to the radio 214 and receive signals or data from the radio 214. Communications between antenna 216 and radio 214 can occur using any number of physical paths. Accordingly, any number of ports 228 can be used to connect the physical paths to the antenna 216. For instance, a first port can connect a first physical path to an antenna, a second port can connect a second physical path to the antenna, a third port can connect a third physical path to the antenna, and a fourth port can connect a fourth physical path to the antenna.

In implementation of embodiments of the present invention, initially, a test signal is initiated. A test signal refers to a signal transmitted in an effort to identify an antenna port through which the signal is transmitted. In this regard, a test signal is used to identify an antenna port that receives the test signal. A test signal can be a unique signal that indicates the signal is a test signal such that an antenna port can be identified. For example, a test signal may be of a particular sequence so that it can be identified as a test signal, for instance, rather than noise. In another example, a test signal has a frequency that is out of band with the supported antenna frequencies so that interference is prevented.

A test signal can be initiated in any number of manners. In one embodiment, a test signal is initiated by a user or technician at the base station 212. In this regard, the user can initiate a test signal via a computing device, such as computing device 100 of FIG. 1, having a user interface located at the base station 212. In another embodiment, a test signal is initiated by a user or technician at the base station manager 218. As such, a user can initiate a test signal via a computing device, such as computing device 100 of FIG. 1, remotely located at the base station manager 218 or other remote location. In any case, a user can provide an indication to run a test signal on a particular physical path and/or radio port. By way of example, a user at the base station 212 or base station manager 218 can input a logical signal to the radio 214 indicating to the radio 214 to generate a RF signal on a specified radio port, which can then be transmitted to the antenna. By way of another example, a user may directly provide input to the radio to generate a logical signal and transmit such a signal to the antenna.

In initiating a test signal, an indication of a physical path and/or radio port to utilize for the test signal may be designated in any manner. For instance, a user might designate which physical path the test signal is to be transmitted. In another example, a user might designated a particular radio port through which a test signal is to be transmitted.

In some implementations, a test signal is generated at the base station 212 and communicated to the radio 214 for transmission through the appropriate radio port and/or physical path. In such an implementation, the test signal is transmitted from the base station 212 to the radio 214 using, for instance, data transmission path 222. In other implementations, an indication to perform a test signal is provided by the base station 212 to the radio 214, which generates a test signal and transmits the test signal through the designated radio port and/or physical path. In this regard, an indication of a desired or intended test signal can be transmitted to the radio 214 via, for example, data transmission path 222. Thereafter, the radio

214 can generate the test signal and transmit the test signal to the antenna 216 using the designated radio port and/or physical path.

An identification device or set of identification devices 230 can be implemented in association with one or more antenna ports 228 to facilitate identification of an antenna port receiving a test signal. That is, an identification device identifies to which antenna port a particular physical path and/or radio port is connected. In some embodiments, a single identification device that is integrated with or connected to each of the ports can be utilized. In this regard, an antenna includes a single identification device that is communicatively coupled with all of the antenna ports. In other embodiments, as illustrated in FIG. 2, a single identification device may be integrated with or connected to a single antenna port. In this regard, each antenna port is communicatively coupled with a corresponding identification component 230. As such, an antenna includes multiple identification devices with one device for each antenna port. As can be appreciated, although identification of antenna ports is generally referred to herein, in embodiments, identification of antenna ports can be extended to antenna ports and/or associated radiating elements. In this regard, embodiments and implementations described herein can be used to identify antenna ports and associated radiating elements which are an integral aspect of the beam forming and MIMO perspective. The antenna port is a connector that allows a RF path to connect to a radiating element(s).

An identification device can be any electronic component(s), computing device(s), or chip(s), such as an integrated circuit (IC) chip. An identification device(s) can be installed in an antenna as an independent component(s). In other implementations, the functionality of an identification device described herein can be added into or incorporated with existing components employed by antennas (e.g., AISG hardware or software).

An identification device is configured to detect or recognize a test signal. In this regard, an identification device is configured to determine whether a received signal is a test signal. In some embodiments, an identification device recognizes when a signal is of a particular sequence or frequency such it can identify the signal as a test signal, for instance, as opposed to noise or other signal.

Upon recognizing or detecting a test signal, the identification device can generate a response signal that includes an indication of the antenna port that received the test signal. In some cases, a response signal can be communicated using the same port and/or physical path used by the test signal received. Such a response signal can be provided through the previously used physical path to the radio 214. Thereafter, the response signal (or other signal) can be communicated to the base station 212 from the radio, for example, via the data transmission path 222. In other cases, the identification device can utilize another physical path or method for providing the response signal. For example, a response signal can be provided through other connections, such as AISG.

The response signal can include any indication of the antenna port used to receive a test signal. An antenna port indicator may include any level of detail and, as such, may be a complex or basic identifier. In this regard, in some cases, an antenna port indication provides an identification or indication of the port through which a test signal was received (e.g., via a unique port identifier), the orientation of an antenna element through which a test signal was received, a polarization of an antenna element through which a test signal was received, specification information about the antenna or antenna port (e.g., gain, horizontal beamwidth, tilt, frequencies support, effective downtilt, XPD at 3 db, XPD at +/−60 degrees, intra-array port to port isolation, dimensions, passive intermodulation (PIM) information, $1^{st}$ upper sidelobe suppression, horizontal beamwidth squint, voltage standing wave radio (VSWR), etc.), or the like. An orientation may describe or indicate a tilt of one or more elements of an antenna (or antenna array). An antenna element refers to elements of an antenna that actually radiate when power is applied thereto. Generally, movement occurs at the frequency of the power being applied, and the strength of this movement can be directly related to the power applied.

For instance, assume an antenna array has two antenna ports. One port will be the +45 degree element of the array, and the other port will be the −45 degree element of the array. These two ports are separately transmitting elements but are related to each other as they are 90 degrees out of phase with each other. Such an orientation can be used to help determine the antenna port. By way of further example only, an antenna port indicator may identify a left or right port and/or a positive or negative angle of orientation (e.g., left +45), a port number (e.g., port 3), or the like.

In some cases, the identification device(s) can be preloaded with an indication of the corresponding port(s) (i.e., antenna port indicator). In this regard, a first identification device can contain a first unique identifier for a first antenna port, and a second identification device can contain a second unique identifier for a second antenna port.

In one embodiment, an antenna port indicator may be a simple signal that is generated and transmitted when a test signal is received. Upon receiving such a signal (e.g., at the base station 212 or the base station manager 218), such a signal could be looked up to identify which port was utilized. For example, a computing device may receive the signal and present the signal to the user such that the user could use an index or datasheet to lookup the corresponding port. In another example, a computing device might receive the signal and automatically identify the corresponding port, for instance, using an index or lookup system. In another embodiment, a more complex antenna port indicator could be utilized that contains more detailed information pertaining to the antenna port that received a test signal. In this way, a user can be provided with and readily recognize the port and/or details associated therewith (e.g., orientation, spatial placement, etc.).

An antenna port indicator, or a portion or modification thereof, can be presented to a user, for example, via a user interface or display screen. Such a display screen might be accessible via the base station 212, base station manager 218, or other computing device (e.g., a mobile technician device). Upon identifying the antenna port that received a test signal, an association can be made between that antenna port and the physical path and/or radio port that provided the test signal. For example, an association between an antenna port and a physical path and/or radio port can be made as a user can designate which physical path and/or radio port to utilize and, in response, receives an indication of the antenna port utilized.

Based on an understanding of antenna ports and their corresponding physical paths and/or radio ports, ports can be recorded and/or modified. That is, upon identifying which antenna ports correspond to which physical paths and/or radio ports, such associations can be documented and/or modified, if needed. In some embodiments, a user can physically change or modify ports when the user has physical access to the ports. That is, a user having access to radio ports and/or antenna ports can interchange the port(s) to which a particular physical path(s) is connected. For example, coaxial cables can be connected to proper or appropriate ports.

In other embodiments, utilization of ports can be electronically modified. That is, in cases that physical access to the ports is not available, software can be used to modify utilization of ports. For example, using software, a user can modify LTE settings to change ports to accommodate needs. In this regard, a user might set LTE settings a certain way to optimize data transmissions. By way of another example, assume a user has performed tests to identify the antenna ports connected to particular physical paths. As such, a user can make a modification such that MIMO signals now utilize a most efficient path. In some embodiments, a signal(s) being transmitted from a radio port(s) can be modified. For instance, instead of putting a CDMA carrier with LTE, the software may switch the CDMA carrier to transmit on a different port if CDMA and LTE on the same path is not ideal. Further, if certain paths are better for MIMO, the MIMO branches can be modified to transmit on the optimal path(s). As can be appreciated, such an implementation to electronically configure port utilization and/or modify settings for optimization can be performed remotely, for instance, at the base station manager 218 or other remote location.

Although embodiments are described herein as the radio transmitting the test signal and antenna ports supporting identification devices, any number of embodiments can be similarly implemented and embodiments are not intended to limit the scope of the invention. For instance, in other implementations, an antenna, or a component thereof, could be configured to generate and/or transmit a test signal to a radio having ports connected to an identification device(s). In such a case, the radio port that receives the test signal is identified and provided. In yet another implementation, one or more identification devices could be positioned at a location along the physical path that is between the antenna and radio to facilitate identification of an antenna port, a radio port, and/or a physical path.

Figure 3:
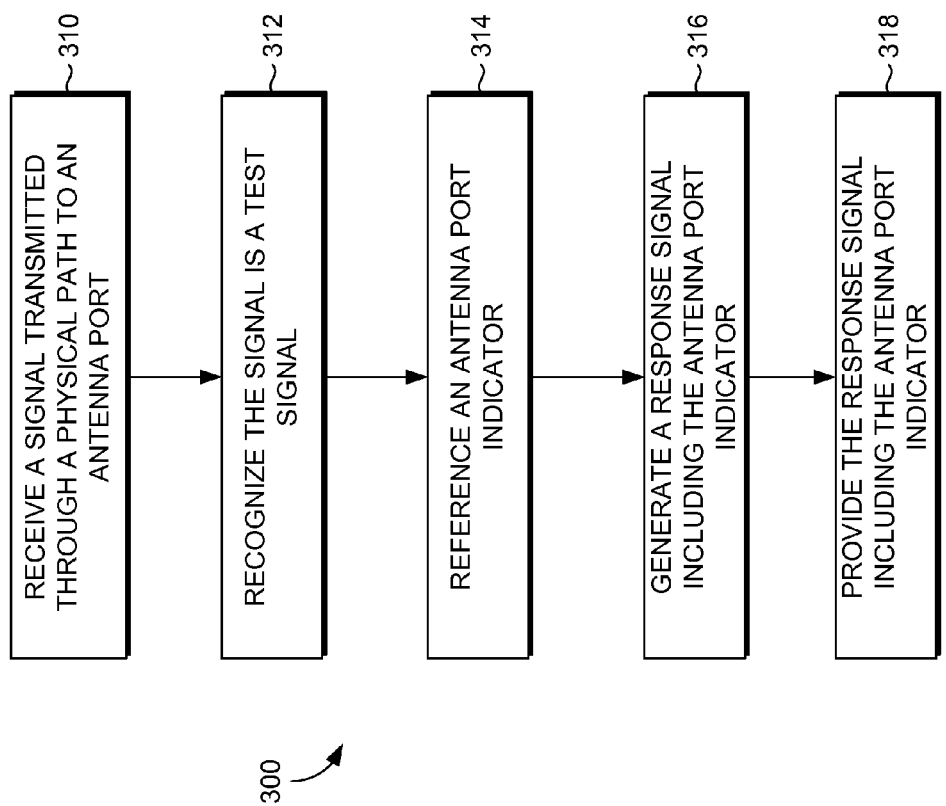
FIG. 3 provides an exemplary first method for facilitating antenna port identification, in accordance with an embodiment of the present invention.

With reference to FIG. 3, a flow diagram is shown illustrating a method 300 for facilitating identification of antenna ports, in accordance with an embodiment of the present invention. Initially, as indicated at block 310, a signal transmitted through a physical path to an antenna port is received. At block 312, it is determined or recognized that the signal is a test signal transmitted for the purpose of identifying an antenna port. At block 314, an antenna port indicator is referenced. Thereafter, at block 316, a response signal including the antenna port indicator is generated. The antenna port indicator can provide any level of port detail that indicates the port that received the test signal. The response signal including the antenna port indicator is provided, for example, to the radio, base station, and/or base station manager. This is indicated at block 318. In some embodiments, the response signal can be provided using the same physical path and antenna port that received the test signal.

Figure 4:
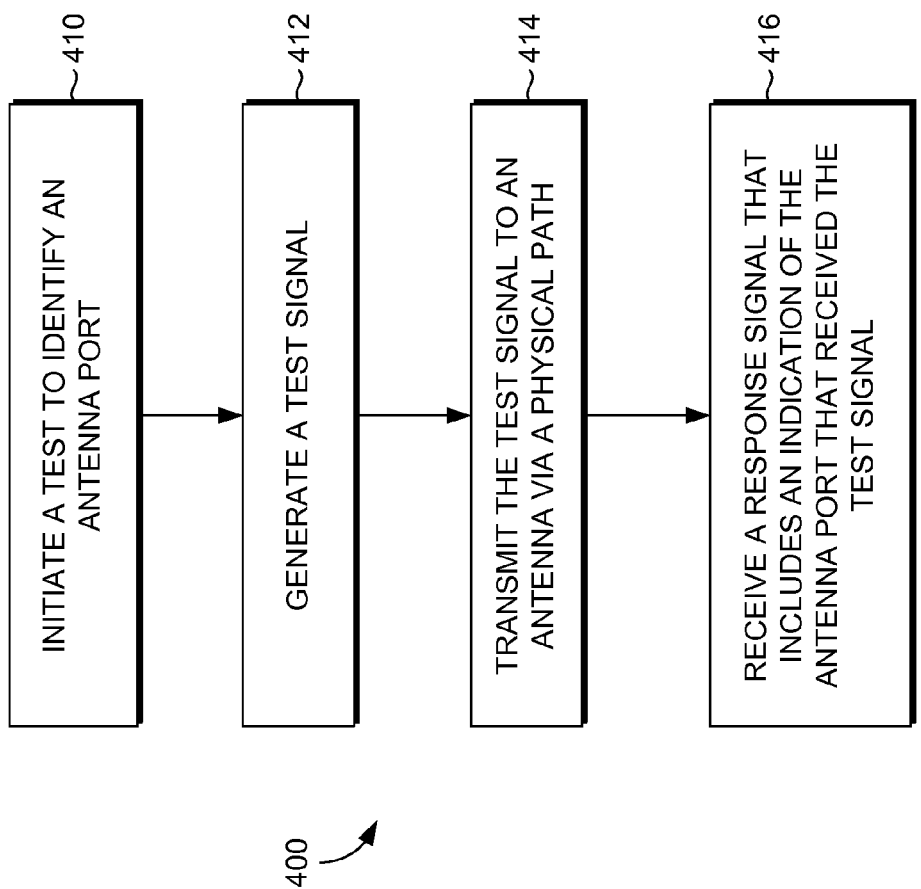
FIG. 4 provides an exemplary second method for facilitating antenna port identification, in accordance with an embodiment of the present invention.

Turning now to FIG. 4, a flow diagram is shown illustrating a method 400 for facilitating identification of antenna ports, in accordance with an embodiment of the present invention. Initially, as indicated at block 410, a test to identify an antenna port is initiated. In embodiments, such a test might be initiated by a user, for instance, via a base station, a base station manager, or other component or computing device. Subsequently, at block 412, a test signal is generated. The test signal is transmitted to an antenna through a physical path. This is indicated at block 414. In embodiments, the test signal is transmitted in accordance with a designated radio port and/or physical path used for signal/data transmission between the radio and antenna (e.g., a physical path and/or radio port indicated by the user). As can be appreciated, in one implementation, a test signal is transmitted from the base station through a radio to the antenna. In another implementation, a test signal is transmitted from a radio to the antenna, for instance, based on an indication from the base station.

At block 416, a response signal is received that includes an indication of the antenna port that received the test signal. Such an indication of the antenna port can include any amount of details pertaining to the port. In some embodiments, the response signal and/or indication of the antenna port is provided to another component for presentation to a user (e.g., a base station having a computing device or a base station manager having a computing device). For example, in cases that the response signal is received at the radio, the radio may transmit the response signal, the indication of the antenna port, or data associated therewith to the base station for presentation to a user. As another example, in cases that the response signal is received at the base station, the base station may transmit the response signal, the indication of the antenna port, or data associated therewith to the base station manager for presentation to a user. In other embodiments, the indication of the antenna port is presented to the user by the component receiving the response signal. For example, in cases that the response signal is received at the base station, the base station, or a component thereof (e.g., a computing device) can present the antenna port identification to the user. Upon identifying the antenna port, a user can utilize such information to verify configurations and/or optimize data transmission efficiency related to the radio tower.

It will be understood by those of ordinary skill in the art that the order of steps shown in the method 300 of FIG. 3 and method 400 of FIG. 4 are not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for facilitating identification of antenna ports, the method comprising:
   receiving a test signal transmitted through a tangible physical path from a radio to an antenna port of a first antenna at a radio tower, wherein the first antenna is connected to a plurality of physical paths by a plurality of antenna ports, each antenna port of the plurality of antenna ports corresponding to one physical path; and
   providing a response signal that includes an indication of one antenna port that received the test signal via one corresponding physical path, such that the one antenna port identified is distinguishable from the plurality of antenna ports of the first antenna.

2. The media of claim 1 further comprising referencing the indication of the one antenna port.

3. The media of claim 1, wherein the test signal has a frequency that differs from one or more frequencies supported by the antenna for device communications.

4. The media of claim 1, wherein the response signal is provided using the one antenna port and the corresponding tangible physical path through which the test signal was received.

5. The media of claim 1, wherein the indication of the one antenna port comprises an antenna port identifier that is specific to the one antenna port, a location of the one antenna port, or a combination thereof.

6. The media of claim 1 further comprising generating the response signal including the indication of the one antenna port that received the test signal.

7. A system for facilitating identification of antenna ports, the system comprising:
- a radio comprising a transceiver that transmits and receives signals, wherein the radio transmits test signals via a plurality of tangible physical paths; and
- a first antenna having a plurality of antenna ports at a radio tower, the first antenna connected to the plurality of tangible physical paths by a plurality of antenna ports, each antenna port of the plurality of antenna ports corresponding to one tangible physical path, wherein each antenna port of the plurality has an identification device, each identification device configured to:
  - identify a test signal received at one corresponding antenna port from the radio via one of the plurality of tangible physical paths and
  - provide an indication of the one antenna port that received the test signal.

8. The system of claim 7, wherein the radio generates the test signals transmitted via the plurality of tangible physical path.

9. The system of claim 8, wherein the radio generates the test signals based on an indication received from a base station.

10. The system of claim 7, wherein a first test signal is transmitted in accordance with a first designated physical path, and a second test signal is transmitted in accordance with a second designated physical path.

11. The system of claim 7, wherein the radio has a plurality of radio ports, each of the radio ports connecting one of the tangible physical paths to the radio.

12. The system of claim 7, wherein each of the identification devices of the plurality of antenna ports comprises an electronic component or an integrated circuit chip.

13. The system of claim 7, further comprising a base station that is used to initiate transmission of the test signals.

14. The system of claim 7, further comprising a base station manager that is used to initiate transmission of the test signals by way of a base station in communication with the radio.

15. A method for facilitating identification of antenna ports, the method comprising:
- transmitting a test signal that indicates an intent to identify an antenna port within a first antenna that receives the test signal, wherein the test signal is transmitted at least from a radio to the first antenna at a radio tower via a first tangible physical path, wherein the first antenna is connected to a plurality of tangible physical paths by a plurality of antenna ports, each antenna port of the plurality of antenna ports connecting one tangible physical path of the plurality of tangible physical paths to the first antenna; and
- receiving an indication of a first antenna port that received the test signal via the first tangible physical path corresponding to the first antenna port.

16. The method of claim 15 further comprising generating the test signal based on a user indication to perform an antenna port identification.

17. The method of claim 16, wherein the test signal is transmitted in accordance with a tangible physical path or a radio port designated by the user.

18. The method of claim 15, wherein the test signal is initiated by a user at a base station or a base station manager.

19. The method of claim 15, wherein the indication of the first antenna port comprises a unique antenna port identifier, an antenna port location, an antenna port orientation, or a combination thereof, such that the first antenna port is distinguishable from the plurality of antenna ports of the first antenna.

* * * * *